United States Patent
Guillez et al.

(10) Patent No.: US 6,796,598 B2
(45) Date of Patent: Sep. 28, 2004

(54) VEHICLE RETRACTABLE ROOF WITH TWO PIVOTING ARMS

(75) Inventors: Jean-Marc Guillez, Cirieres (FR); Gérard Queveau, Le Pin (FR)

(73) Assignee: France Design, Le Pin (FR)

(*) Notice: Subject to any disclaimer, the term of this patent is extended or adjusted under 35 U.S.C. 154(b) by 0 days.

(21) Appl. No.: 10/416,291

(22) PCT Filed: Nov. 6, 2001

(86) PCT No.: PCT/FR01/03432
§ 371 (c)(1),
(2), (4) Date: May 6, 2003

(87) PCT Pub. No.: WO02/36377
PCT Pub. Date: May 10, 2002

(65) Prior Publication Data
US 2004/0012223 A1 Jan. 22, 2004

(30) Foreign Application Priority Data
Nov. 6, 2000 (FR) .......................... 00 14183

(51) Int. Cl.[7] ............................................ B60J 7/08
(52) U.S. Cl. ................................. 296/108; 296/107.18
(58) Field of Search ...................... 296/108, 107.16, 296/107.17, 107.18

(56) References Cited
U.S. PATENT DOCUMENTS
6,478,362 B2 * 11/2002 Obendiek ................... 296/108
6,572,175 B2 * 6/2003 Schutt et al. ............... 296/108

* cited by examiner

Primary Examiner—Joseph D. Pape
(74) Attorney, Agent, or Firm—Nawrocki, Rooney & Sivertson, P.A.

(57) ABSTRACT

The invention concerns a vehicle retractable roof, comprising a front roof element (1), an intermediate roof element (2) and a rear roof element (3). The displacement of the rear element (3) towards the rear deck (5) is controlled by at least an arm (6) articulated to the vehicle chassis and to the rear element (3). The invention is characterised in that the rear element (3) is linked to the intermediate element (2) through a lever (9) articulated near the front edge of the rear element (3) and articulated to the intermediate element (2), the latter being linked to the chassis through a second arm (12) articulated to the chassis and to the intermediate element (2), and the front of the intermediate element (2) is linked to the front element (1) through two articulated levers (15, 16) forming a deformable quadrilateral, the second arm (12) articulated to the chassis being linked to one (15) of the two levers forming a deformable quadrilateral by a hinge link (17) articulated to the second arm (12) and to the lever (15), and a link is provided between the first arm (6) and the second arm (12) or between the first arm (6) and one (9) of the levers linking the rear element (3) to the intermediate element (2) or between the latter lever (9) and a fixed articulation point (20) of the chassis.

6 Claims, 1 Drawing Sheet

VEHICLE RETRACTABLE ROOF WITH TWO PIVOTING ARMS

FIELD OF THE INVENTION

The present invention concerns a roof which can be retracted or withdrawn into the rear boot of a vehicle.

BACKGROUND OF THE INVENTION

Such a retractable roof makes it possible in particular to convert a vehicle of the two-seater coupé or four-seater coupé or saloon type into a vehicle of the cabriolet type.

In the case of four-seater coupés or saloons, the roof has a relatively long length, so that the retractable roof is composed of three elements, each of which has a length compatible with the dimensions of the vehicle boot.

Thus a retractable roof for a vehicle is known, comprising a front roof element, an intermediate roof element and a rear roof element, these three elements being able to move between a position in which they cover the vehicle cabin and a position in which they are superimposed substantially horizontally in the rear boot of the vehicle.

The aim of the present invention is to afford improvements to the known means, in order to optimally control and guide the movement of the roof elements between their closure position and their position of storage in the boot.

SUMMARY OF THE INVENTION

According to the invention, the retractable roof is characterised in that the movement of the rear element towards the boot is controlled by at least one arm articulated on the chassis of the vehicle and on the rear element, in that the rear element is connected to the Intermediate element by a lever articulated close to the front edge of the rear element and articulated on the intermediate element, the latter being connected to the chassis by a second arm articulated on the chassis and on the intermediate element, in that the front of the intermediate element is connected to the front element by two articulated levers forming a deformable quadrilateral, the said second arm articulated on the chassis being connected to one of the two levers forming a deformable quadrilateral by a link articulated on the said second arm and on the said lever, and in that connection means are provided between the first arm and the second arm or between the first arm and one of the levers connecting the rear element to the intermediate element or between the latter lever and a fixed articulation point on the chassis. Other particularities and advantages of the invention will also emerge from the following description.

BRIEF DESCRIPTION OF THE DRAWING

In the accompanying drawings, given by way of non-limiting examples.

DETAILED DESCRIPTION OF THE INVENTION

Figure 1:
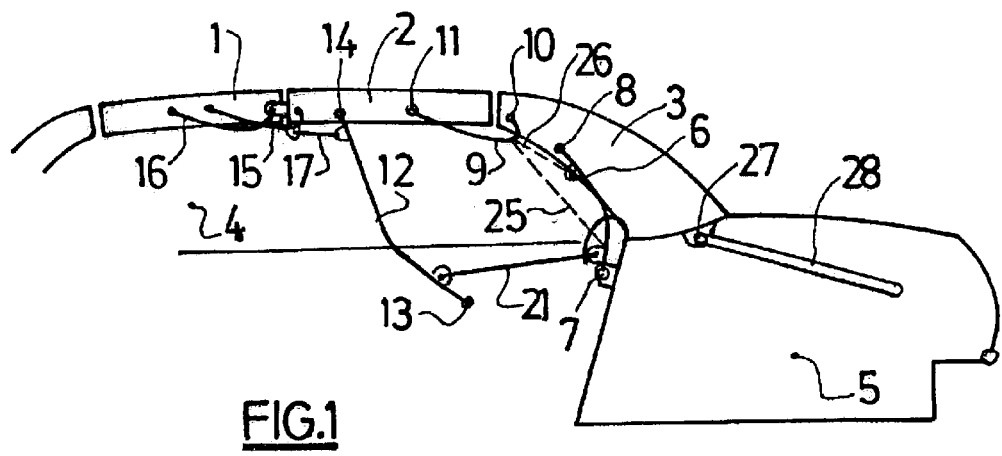
FIG. 1 is a schematic view in partial longitudinal section of a vehicle equipped with a retractable roof according to the invention, in the closed position.
Figure 2:
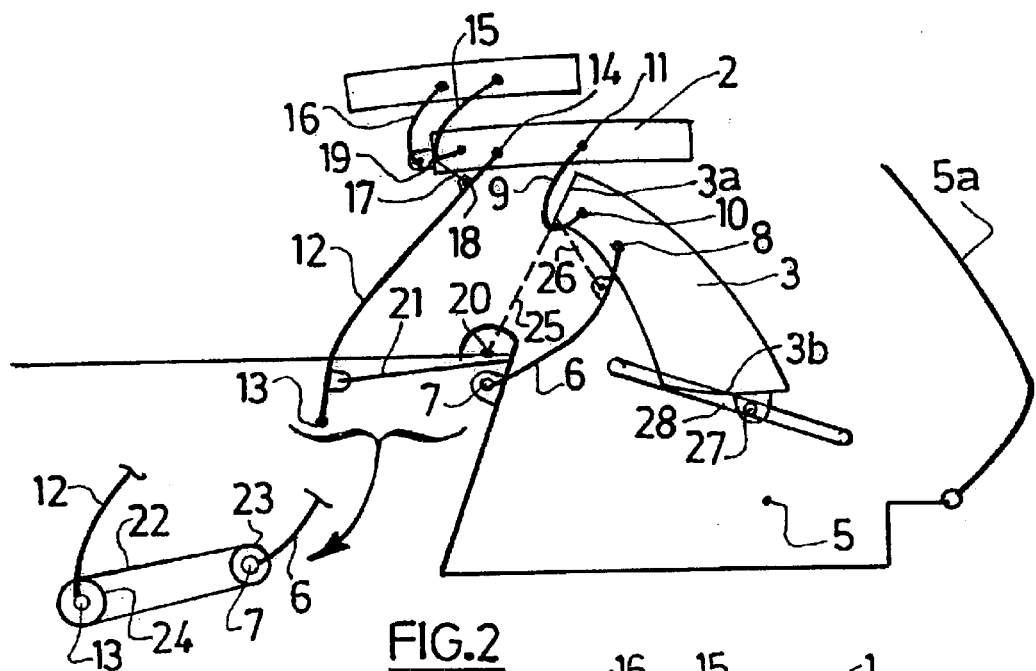
FIG. 2 is a view similar to FIG. 1, the retractable roof being in an intermediate position.
Figure 3:
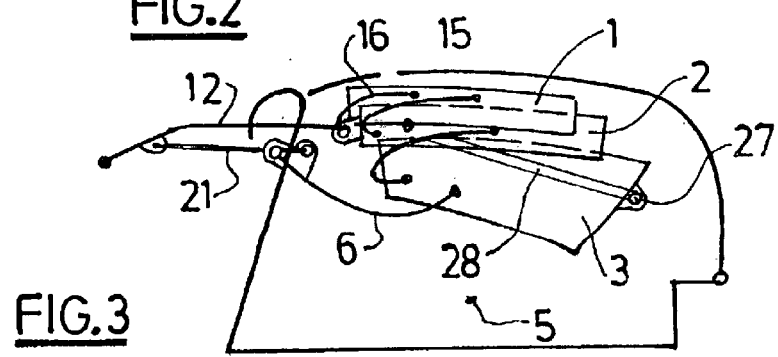
FIG. 3 is a view similar to FIGS. 1 and 2, the retractable roof being in the position stored in the vehicle boot.

In the embodiment depicted in FIGS. 1 to 3, the retractable roof comprises a front roof element 1, an intermediate roof element 2 and a rear roof element 3. These three elements 1, 2, 3 are able to move between a position in which (see FIG. 1) they cover the cabin 4 of the vehicle and a position in which (see FIG. 3) they are superimposed substantially horizontally in the rear boot 5 of the vehicle.

According to the invention, the movement of the rear element 3 towards the boot 5 is controlled by an arm 6 articulated at 7 on the chassis of the vehicle and at 8 on the rear element 3.

The rear element 3 is connected to the intermediate element 2 by a lever 9 articulated at 10 close to the front edge 3a of the rear element 3 and is articulated at 11 on the intermediate element 2. The latter is connected to the chassis by a second arm 12 articulated at 13 on the chassis and at 14 on the intermediate element 2.

The front of the intermediate element 2 is connected to the front element 1 by two articulated levers 15, 16 forming a deformable quadrilateral.

The second arm 12 articulated on the chassis is connected to one 15 of the two levers forming a deformable quadrilateral by a link 17 articulated at 18 on the second arm 12 and at 19 on the lever 15.

In addition, connection means are provided between the first arm 6 and the second arm 12 or between the first arm 6 and the lever 9 connecting the rear element 3 to the intermediate element 2 or between the lever 9 and a fixed articulation point 20 on the chassis.

According to a first version, the aforementioned connection means comprise a link 21 articulated on the first arm 6 and on the second arm 12. This link 21 can be replaced (see FIG. 2) by a chain 22 or a notched belt wound around two gears 23, 24 mounted on the pivot shafts 7 and 13 of the arms 6 and 12 and fixed to these.

In a second version, a lever 25 is articulated on the lever 9 connecting the rear element 3 and the intermediate element 2 and articulated at a fixed point 20 on the chassis.

In a third version, the connection means comprise a link 26 articulated on the first arm 6 and on one 9 of the levers connecting the rear 3 and intermediate 2 elements.

In the example depicted in FIGS. 1 to 3, the movement of the rear element 3 towards the boot 5 Is also controlled by a finger 27 carried by the rear part 3b of the rear element 3 slidably engaged in a runner 28 extending inside the boot 5.

Instead of the finger 27 and the runner 28, the movement of the rear element 3 towards the boot 5 can be controlled by a second arm (not shown) articulated on the chassis and on the rear part 3b of the rear element 3.

The retractable roof which has just been described functions as follows:

After unlocking of the elements 1, 2, 3 and opening of the lid 5a of the boot 5, the pivoting of the arm 6 controlled by a motor or actuator drives the rear element 3 towards the boot 5, the movement of this element 3 being guided by the sliding of the finger 27 along the runner 28.

The movement of the element 3 makes the levers 9, 12 pivot upwards and towards the rear, by virtue of the connection means 21 or 22 or 25 or 26.

The movement of the levers 9, 12 raises the element 2 and makes it pass above the rear element 3, as shown by FIG. 2.

The pivoting of the arm 12 controls, by means of the link 17 connecting this arm 12 to the lever 15, the pivoting of the levers 15, 16 and the raising of the front element 1, which thus passes over the intermediate element 2, as also shown by FIG. 2.

The movement of the elements 1, 2, 3 continues until they are stored substantially horizontally in the boot 5, as shown by FIG. 3.

In a simplified version of the invention, in particular in the case of coupes which have only two seats, the retractable roof could comprise only the two elements 2 and 3.

What is claimed is:

1. A retractable roof for a vehicle, comprising a front roof element, an intermediate roof element and a rear roof element, these three elements being able to move between a configuration in which they cover the vehicle cabin and a configuration in which they are superimposed substantially horizontally in a rear boot of the vehicle, characterised in that the movement of the rear element towards the boot is controlled by at least one arm articulated on the chassis of the vehicle and on the rear element, in that the rear element is connected to the intermediate element by a lever articulated close to a front edge of the rear element and articulated on the intermediate element, said intermediate element being connected to the chassis by a second arm articulated on the chassis and on the intermediate element, in that the front of the intermediate element is connected to the front element by two articulated levers forming a deformable quadrilateral, said second arm articulated on the chassis being connected to one of the two levers forming a deformable quadrilateral by a link articulated on said second arm and on said one of the two levers, and in that connection means are provided between the first arm and the second arm or between the first arm and the lever connecting the rear element to the intermediate element or between the lever connecting the rear element to the intermediate element and a fixed articulation point on the chassis.

2. A retractable roof according to claim 1, characterised in that said connection means comprise a link articulated on the first arm and on the second arm.

3. A retractable roof according to claim 1, characterised in that said connection means comprise a lever articulated on one of the levers connecting the rear element and the intermediate element and articulated at a fixed point on the chassis.

4. A retractable roof according to claim 1, characterised in that said connection means comprise a link articulated on the first arm and on the lever connecting the rear and intermediate elements.

5. A retractable roof according to claim 1, characterised in that said connection means comprise a chain or a notched belt wound around two gears mounted on pivot shafts and of the arms and fixed to these said shafts.

6. A retractable roof according to claim 1, characterised in that the movement of the rear element towards the boot is also controlled by a finger carried by a rear part of the rear element slidably engaged in a runner extending inside the boot.

* * * * *